United States Patent
Kibune

(10) Patent No.: US 9,377,123 B2
(45) Date of Patent: Jun. 28, 2016

(54) SOLENOID VALVE

(71) Applicant: FUJIKOKI CORPORATION, Setagaya-ku, Tokyo (JP)

(72) Inventor: Hitoshi Kibune, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 122 days.

(21) Appl. No.: 14/031,235

(22) Filed: Sep. 19, 2013

(65) Prior Publication Data

US 2014/0084194 A1   Mar. 27, 2014

(30) Foreign Application Priority Data

Sep. 26, 2012   (JP) .................................. 2012-212223

(51) Int. Cl.
*F16K 31/06* (2006.01)
*F16K 27/02* (2006.01)

(52) U.S. Cl.
CPC ........... *F16K 31/0675* (2013.01); *F16K 27/029* (2013.01); *F16K 31/0606* (2013.01); *F16K 31/0627* (2013.01); *Y10T 137/86622* (2015.04); *Y10T 137/87708* (2015.04)

(58) Field of Classification Search
CPC .............. F16K 31/0675; F16K 27/029; F16K 31/0627; F16K 31/0606; F16K 31/0655; F16K 31/0651; F16K 31/0613; Y10T 137/877; Y10T 137/87708; Y10T 137/87772; Y10T 137/8778; Y10T 137/87829; Y10T 137/87837; Y10T 137/87861; Y10T 137/86501; Y10T 137/86509; Y10T 137/86517; Y10T 137/86549; Y10T 137/86879; Y10T 137/86895; Y10T 137/86622
USPC ......... 137/861, 862, 870, 871, 877, 878, 881, 137/625.11, 625.12, 625.13, 625.17, 137/625.48, 625.5, 625.65; 251/129.21, 251/129.15; 335/255
See application file for complete search history.

(56) References Cited

U.S. PATENT DOCUMENTS

| | | | | |
|---|---|---|---|---|
| 5,503,185 | A * | 4/1996 | Krause ..................... | 137/625.65 |
| 6,805,310 | B2 * | 10/2004 | Yamashita ................. | 239/585.1 |
| 7,325,563 | B2 * | 2/2008 | Seko ............................. | 137/341 |

* cited by examiner

*Primary Examiner* — Michael R Reid
(74) *Attorney, Agent, or Firm* — Bacon & Thomas, PLLC

(57) ABSTRACT

A solenoid valve is provided with a valve main body having a valve chamber communicating with an inlet port and a first outlet port, a valve body arranged within the valve chamber, a valve holder retaining the valve body, a coil spring energizing the valve holder, a pipe member having a second outlet port communicating with the valve chamber, a suction element surrounding the pipe member, a coil bobbin winding an electromagnetic coil, and a mold cover surrounding a whole of the coil bobbin, integrated with the valve main body, and defining the valve chamber. The valve holder has a tube body facing to the suction element, and a small tube portion formed smaller in diameter than the tube body, pierced a fluid insertion hole in an intermediate portion, and having a retention portion retaining the valve body in an inner side of a leading end.

6 Claims, 2 Drawing Sheets

SOLENOID VALVE

BACKGROUND OF THE INVENTION

1. Field of the Invention

The present invention relates to a solenoid valve which is used for switching a flow path of a washer fluid (a cleaning fluid) in a window washer device installed to a motor vehicle, or a solenoid valve which switches a flow path of the other fluid.

2. Description of the Conventional Art

Conventionally, a solenoid valve, for example, disclosed in Japanese Utility Model Publication No. 6-49982 is provided with an input port and two output ports, and is provided with a coil bobbin which has one output port (a first output port in the Japanese Utility Model Publication No. 6-49982) and a tubular core winding an electromagnetic coil thereto and is made of a resin, and a valve housing which has the input port and the other output port (a second output port in the Japanese Utility Model Publication No. 6-49982), forms a concave portion and is made of a resin, and the tubular core and the first output port are integrally molded with the coil bobbin by resin.

The coil bobbin and the valve housing are covered with a case which is made of a magnetic material so as to be fixed, in a state in which the coil bobbin and the valve housing are confronted with each other. As a result, a valve chamber is constructed by one collar portion of the coil bobbin and the concave portion, and a movable valve body is provided within the valve chamber. Further, a non-adhesive sheet having a plurality of holes is arranged between one end surface of the valve body and a bottom surface of the valve chamber, that is, a bottom surface of the concave portion, and is structured such that a washer fluid flows to the second output port via the holes.

SUMMARY OF THE INVENTION

Problem to be Solved by the Invention

However, in the solenoid valve described in the Japanese Utility Model Publication No. 6-49982, since the valve body is formed as a discoid shape, the valve body is large in a horizontal direction, and there is accordingly a problem that a whole shape of the solenoid valve is enlarged in size and becomes heavy. Particularly, in the case that the solenoid valve is mounted to a vehicle, a compact and light solenoid valve is desirable.

Accordingly, the present invention is made by taking the problem into consideration, and an object of the present invention is to provide a solenoid valve which is downsized in its whole shape, and is weight saved.

Means for Solving the Problem

In order to achieve the object mentioned above, according to the present invention, there is provided a solenoid valve comprising:

a valve main body which has a valve chamber communicating with each of an inlet port and a first outlet port;

a valve body which is arranged within the valve chamber;

a valve holder which retains the valve body and is made of a magnetic material;

an energizing member which energizes the valve holder in a direction of the first outlet port;

a pipe member which has a second outlet port communicating with the valve chamber and is extended upward from the valve chamber;

a suction element which surrounds the pipe member;

an electromagnetic coil which surrounds the suction element;

a coil bobbin which is winded said electromagnetic coil and surrounds the valve holder and the suction element; and a mold cover which surrounds a whole of the coil bobbin, is integrated with the valve main body and defines the valve chamber by the valve main body, the pipe member and the coil bobbin, wherein the valve main body, the pipe member, the coil bobbin and the mold cover are formed by a resin material, wherein the valve holder is slidably arranged inside a lower portion of the coil bobbin, and has a tube body which faces to the suction element, a fluid insertion hole which is pieced in the tube body, and a retention portion which retains the valve body, wherein the valve holder is sucked by the suction element and the valve body closes the second outlet port of the pipe member by exciting the electromagnetic coil, and wherein the valve holder is energized by the energizing member and the valve body closes the first outlet port by cancelling the excitation applied to the electromagnetic coil.

According to the present invention, since the fluid insertion hole is pierced in the tubular valve holder which retains the valve body, and the valve body is retained, it is possible to form the valve body small approximately at the same diameter as the valve holder, and it is possible to downsize a whole of the solenoid valve.

Further, since the pipe member, the coil bobbin, the mold cover and the valve main body are all made of resin, it is possible to weight save the solenoid valve which is assembled by these elements.

In the solenoid valve mentioned above, the valve holder may be provided with a small tube portion which is formed at a smaller diameter than the tube body, and the small tube portion may be provided with the fluid insertion hole and the retention portion. As a result, it is possible to downsize the valve main body. In the solenoid valve mentioned above, the coil bobbin may be provided with a collar wall which faces to the valve main body, and an annular welding projection portion which protrudes toward the valve main body from the collar wall and is welded to an inner peripheral surface of the mold cover, and the annular welding projection portion may be provided with a taper surface which is reduced its diameter little by little from an inner peripheral surface in a leading end side of the annular welding projection portion toward an inner peripheral surface in a root side of the annular welding projection portion, and a burr accommodating space which is constructed between the taper surface and an outer peripheral surface of the valve holder, whereby it is possible to accommodate in the burr accommodating space the burr which is generated in a bonded surface between the annular welding projection portion and the inner peripheral surface of the mold cover when the mold cover is resin molded in the coil bobbin so as to keep clearance. As a result, it is possible to prevent a smooth movement of the valve holder from being blocked by the burr, and prevent a malfunction of the solenoid valve from being generated due to drop of the burr into an inner portion, it is possible to omit a labor hour for a burr removing work which is necessary in the case that the taper surface does not exist, and it is possible to simplify a manufacturing step of the solenoid valve.

In the solenoid valve mentioned above, the pipe member, the coil bobbin and the mold cover may be formed according to a resin molding, and the mold cover and the valve main body may be integrally formed by a laser welding. As a result, it is possible to further simplify the manufacturing step of the solenoid valve, and it is possible to widely lower a manufacturing cost of the solenoid valve.

Effect of the Invention

As mentioned above, according to the present invention, it is possible to downsize a whole of the solenoid valve by making the valve body smaller.

BRIEF EXPLANATION OF THE DRAWINGS

FIGS. 1A and 1B are views showing an embodiment of a solenoid valve according to the present invention, in which FIG. 1A is a cross sectional view and FIG. 1B is a top elevational view.

DETAILED DESCRIPTION OF PREFERRED EMBODIMENT

Next, a description will be given in detail of a mode for carrying out the present invention with reference to the accompanying drawings.

Figure 1A:
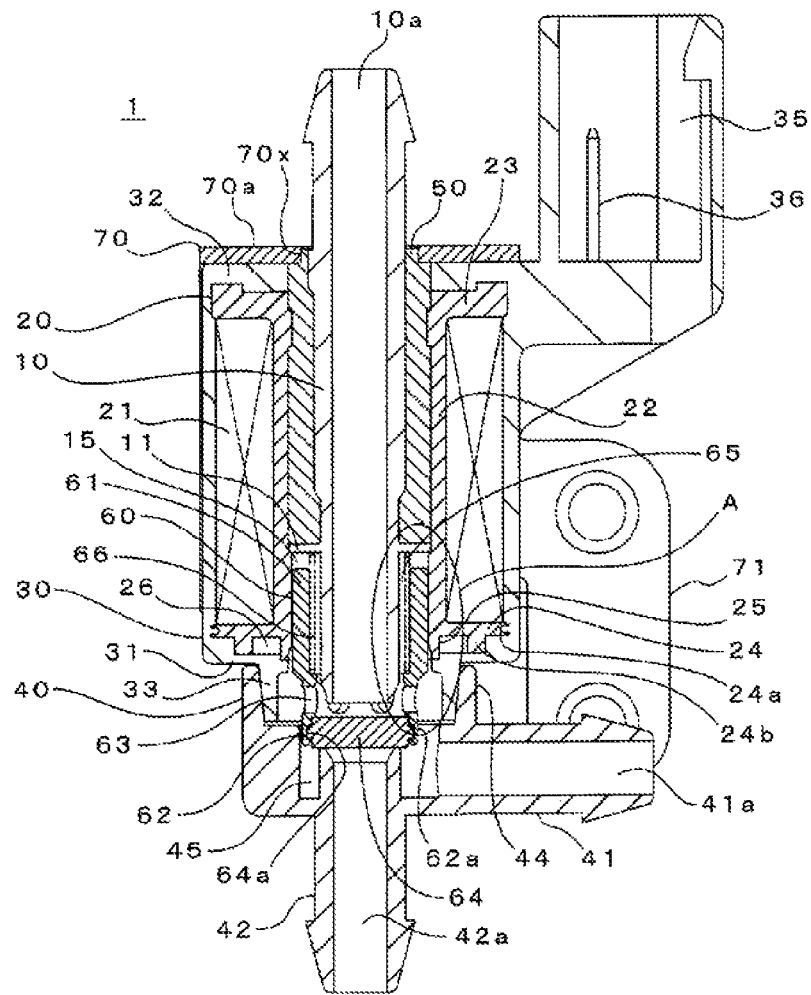
Figure 1B:
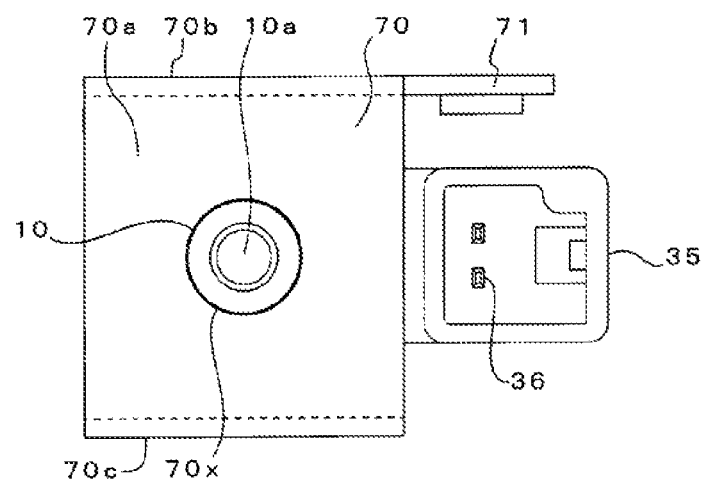
Figure 2:
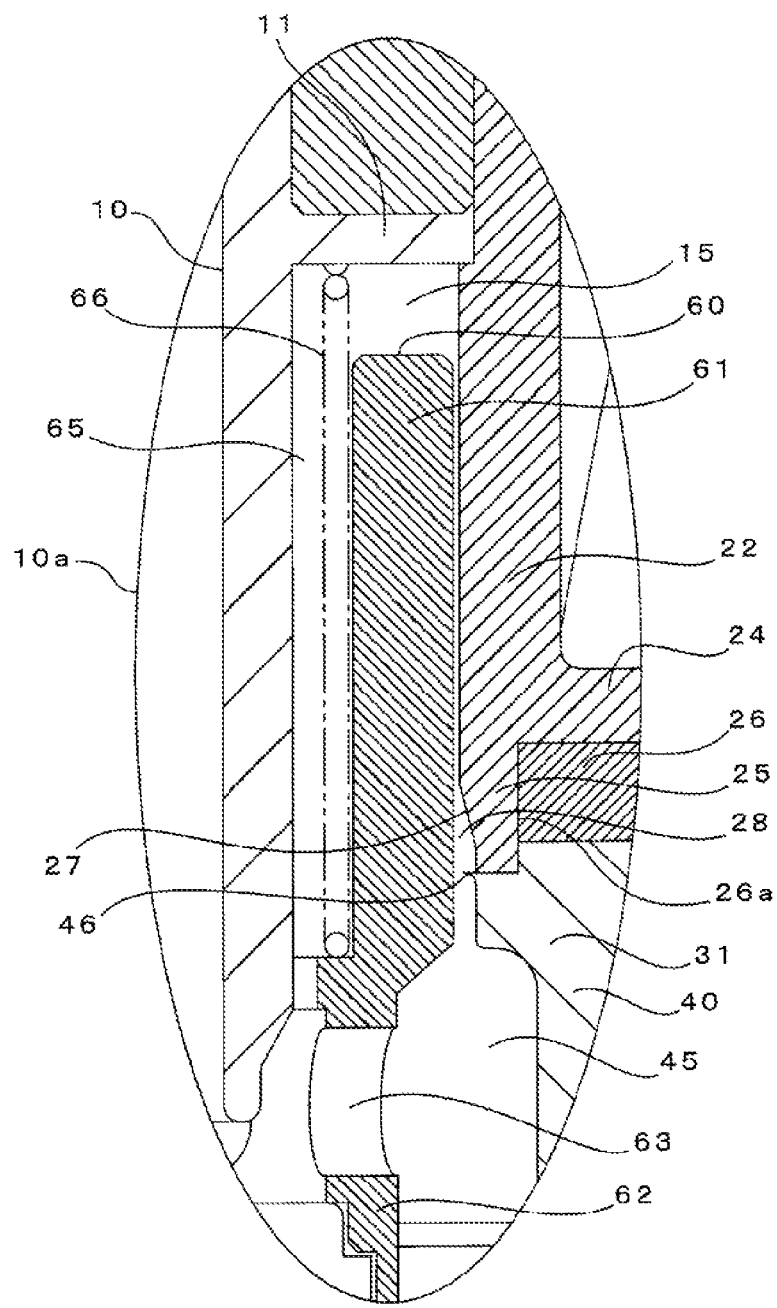
FIG. 2 is an enlarged view of a portion A in FIG. 1.

FIGS. 1 and 2 show an embodiment of a solenoid valve according to the present invention. A solenoid valve 1 is mounted to a vehicle, is structured such as to switch a flow path for a liquid, for example, a cleaning fluid, and the other fluids, and is provided with a valve main body 40 which has a valve chamber 45 communicating with each of an inlet port 41a and a first outlet port 42a, a valve body 64 which is arranged within the valve chamber 45, a valve holder 60 which retains the valve body 64, a coil spring 66 which serves as an energizing member energizing the valve holder 60 in a direction of the first outlet port 42a, a pipe member 10 which has a second outlet port 10a communicating with the valve chamber 45, and is extended upward from the valve chamber 45, a suction element 50 which surrounds the pipe member 10, an electromagnetic coil 21 which surrounds the suction element 50, a coil bobbin 20 which is provided for winding the electromagnetic coil 21, and a mold cover 30 which surrounds a whole of the coil bobbin 20.

The valve main body 40 has an inflow pipe 41 which is made of a resin and extends outward from a peripheral wall, and an outflow pipe 42 which extends outward from a lower end surface. The inlet port 41a is formed in the inflow pipe 41, and the first outlet port 42a is formed in the outflow pipe 42. The inlet port 41a and the first outlet port 42a are communicated with each other so as to form an L-shaped cross section within the valve chamber 45. An annular welding joint wall 44 protruding toward the mold cover 30 is provided around an upper opening of the valve main body 40. An upper end side of the outflow pipe 42 protrudes into the valve chamber 45. Further, the inflow pipe 41 is coupled to a peripheral wall of the valve main body 40, and an opening of the inlet port 41a is structured such as to always guide a washer fluid into the valve chamber 45 by communicating with the valve chamber 45. Here, the valve main body 40 is formed, for example, in a white color so as to transmit a laser beam as mentioned later.

The pipe member 10 is made of a resin, and is structured such that a discoid welding projection portion 11 is provided in an intermediate portion so as to extend in a horizontal direction, and the second outlet port 10a communicates with the valve chamber 45.

The coil bobbin 20 made of the resin has a body 22 which winds an electromagnetic coil 21 thereto, and a pair of collar walls 23 and 24 which are continuously formed in both ends of the body 22 and control dispersion of the winding of the electromagnetic coil 21. A discoid welding projection portion 24a is formed in an outer peripheral surface of the lower collar wall 24, and an annular welding projection portion 25 positioned on an extension of the body 22 is integrally formed in an outer surface of the lower collar wall 24. Further, one or a plurality of leg portions 24b extending downward are integrally provided in an outer surface of the lower collar wall 24.

The suction element 50 is formed as a cylindrical shape by a magnetic metal, and is arranged between an inner peripheral surface of the body 22 and an outer peripheral surface of the pipe member 10.

The mold cover 30 is made of a resin, the annular welding projection portion 25 of the coil bobbin 20 is welded to an inner surface of a lower end wall 31 of the mold cover, and the discoid welding projection portion 24a of the coil bobbin 20 is welded to an inner peripheral surface of the mold cover 30. As a result, the mold cover 30 is integrally formed coaxially in the pipe member 10 so as to cover the coil bobbin 20. An annular welding wall 33 is formed in an outer surface of the lower end wall 31 of the mold cover 30. Here, the annular welding wall 33 is formed, for example, in a black color so as to be heated and molten by irradiation of a laser beam.

Between an outer peripheral surface of the pipe member 10 and the body 22 of the coil bobbin 20, the suction element 50 is positioned in an upper side in relation to the discoid welding projection portion 11, and the cylindrical valve holder 60 made of a magnetic material is positioned in a lower side so as to be movable in a vertical direction along the outer peripheral surface of the pipe member 10.

The valve holder 60 is slidably arranged inside a lower portion of the coil bobbin 20 (between a lower inner periphery of the coil bobbin 20 and a lower outer periphery of the pipe member 10), and has a tube body 61 which is positioned between the pipe member 10 and the coil bobbin 20, and a small tube portion 62 which extends from a lower end of the tube body 61 and is smaller in diameter than the tube body 61. One or a plurality of liquid insertion holes (fluid insertion holes) 63 are provided in the small tube portion 62 at its intermediate portion, and a valve body 64 is fixed to a lower end side of the small tube portion 62 according to an appropriate method, the valve body approximately having the same diameter as an inner diameter of the small tube portion 62 and being made of a material having an elasticity, for example, a rubber.

In the present embodiment, the fixing is achieved by fitting a plurality of projections or annular projections which are provided in the outer periphery of the valve body 64 into a concave portion (a retention portion) which is formed in an inner side of the small tube portion 62, by utilizing an elasticity of the valve body 64, however, the valve body 64 may be fixed by using any other means (a retention portion), for example, a caulking means or a bonding means.

Further, the small tube portion 62 is not necessarily provided, but any means (the concave portion mentioned above) for retaining the valve body 64 to the leading end of the tube body 61 may be formed as well as the liquid insertion hole 63 is formed in the tube body 61.

A spring insertion groove 65 which is closed its one end and is open its other end is peripherally provided in an inner peripheral surface of the tube body 61, and a coil spring 66 always energizing the valve holder 60 downward is inserted to the spring insertion groove 65.

The plate 26 made of the magnetic material is insert molded in the mold cover 30. In order to arrange the plate 26 so as to be orthogonal to a center axis of the pipe member 10 and be in close contact with a lower surface of the collar wall 24 of the coil bobbin 20, a large-diameter hole 26a for inserting the annular welding projection portion 25 is formed in the center of the plate 26, and one or a plurality of notches or holes for engaging or inserting one or a plurality of leg portions 24b are provided around the large-diameter holes. The plate 26 is positioned to the lower surface of the collar portion 24 of the coil bobbin 20 by inserting the large-diameter hole 26a to the annular welding projection portion 25 and engaging or inserting the notch or the hole to or with the leg portion 24b.

The plate 26 is structured such that an end portion thereof is exposed from the mold cover 30 after being insert molded in the mold cover 30.

The housing 70 is made of the magnetic material, is provided with a ceiling portion 70a in which a hole 70x for inserting the second outlet port 10a side of the pipe member 10 and an end portion of the suction element 50 is formed, and a pair of side surface plates 70b and 70c which are coupled to the ceiling portion 70a, and is formed as a U-shaped cross sectional shape. The housing 70 covers the mold cover 30 in a U-shaped form, and end portions of a pair of side surface plates 70b and 70c are coupled to an end portion of the plate 26 which is exposed from the mold cover 30 according to a caulking means or the like, whereby the electromagnetic coil 21 and the suction element 50 are covered by a rectangular and annular magnetic material in an outer side of the mold cover.

An attaching portion 71 is integrally provided in the side surface plate 70b in one side of the housing 70, and the solenoid valve 1 can be fixed to the vehicle via the attaching portion 71.

A connector portion 35 is integrally formed in a right side of an upper end wall 32 of the mold cover 30, and an external terminal 36 for exciting the electromagnetic coil 21 is provided in a protruding manner in an inner portion of the connector portion 35.

A taper surface 27 is formed in an inner peripheral surface in a leading end side of the annular welding projection portion 25 of the coil bobbin 20 in the direction of a root from a leading end of the annular welding projection portion 25, as clearly shown in FIG. 2, and a burr accommodating space 28 is formed between the taper surface 27 and an outer peripheral surface of the valve holder 60.

Since the leading end portion of the annular welding projection portion 25 is formed as a planar shape in relation to an inner surface of the lower end wall 31 when the mold cover 30 is resin molded, a burr 46 is generated in a mating surface (a bonded surface) between the planar leading end portion of the annular welding projection portion 25 and the inner surface of the lower end wall 31. However, it is possible to avoid the contact between the burr 46 and an outer peripheral surface of the valve holder 60 by accommodating the burr 46 in the burr accommodating space 28 so as to keep clearance. Accordingly, it is possible to save labor for removing the burr 46 which is generated during the manufacturing of the solenoid valve 1, it is possible to more simplify the manufacturing step, and it is possible to prevent product fault from being generated in the solenoid valve 1.

Next, a description will be given of a manufacturing step of the solenoid valve 1 having the structure mentioned above.

First of all, the pipe member 10 made of the resin is integrally formed in the previously prepared suction element 50 according to an insert molding (a first step).

Next, the coil bobbin 20 is resin molded in an outer peripheral portion of the integrally formed product, that is, an outer peripheral surface of the suction element 50 and the discoid welding projection portion 11. At this time, since the discoid welding projection portion 11 of the pipe member 10 is partly molten its leading end by a molten resin for resin molding the coil bobbin 20, the discoid welding projection portion 11 is firmly coupled to the inner wall of the coil bobbin 20 (a second step).

Next, a bobbin assembly is formed by winding the electromagnetic coil 21 to an outer peripheral surface of the body 22 of the coil bobbin 20 after forming the coil bobbin 20 in an outer periphery of the suction element 50 (a third step).

Next, the plate 26 is arranged in the lower surface of the coil bobbin 20. The arrangement is achieved by inserting the large-diameter hole 26a of the plate 26 to the annular welding projection portion 25 of the coil bobbin 20 as mentioned above, and engaging or inserting the notch or the hole formed in the plate 26 with or to the leg portion 24b of the coil bobbin 20. In a state in which the arrangement is maintained within a metal mold, the mold cover 30 is resin molded so as to cover the coil bobbin 20 to which the magnetic coil 21 is wound and the plate 26.

When the resin molding is carried out, the discoid welding projection portion 24a of the coil bobbin 20 is partly molten by the molten resin of the mold cover 30 so as to be firmly integrated with the inner peripheral surface of the mold cover 30, and the leading end portion of the annular welding projection portion 25 of the coil bobbin 20 is also molten so as to be firmly integrated with the inner surface of the lower end wall 31 of the mold cover 30.

When the welding is carried out, the burr 46 is generated in the mating surface between the leading end portion of the annular welding projection portion 25 and the inner surface of the lower end wall 31, however, since the taper surface 27 is formed as mentioned above, the burr 46 can be accommodated in the burr accommodating space 28, and can be kept clearance within the space 28. As a result, the cover assembly is formed by resin molding the mold cover 30 in the bobbin assembly (a fourth step).

Next, after the valve body 64 is fixed to the lower end side of the small tube portion 62 of the valve holder 60, the coil spring 66 is inserted from the upper end side of the coil spring 66 to the inner portion of the holder accommodating space 15 between the pipe member 10 and the coil bobbin 20 coaxially with the pipe member 10, and one end of the coil spring 66 is struck against the lower surface of the discoid welding projection portion 11. In this state, the tube body 61 is inserted into the holder accommodating space 15 from the upper end side of the valve holder 60 while inserting the coil spring 66 to the spring insertion groove 65. As mentioned above, the valve assembly is constructed by installing the valve body 64 and the valve holder 60 to the cover assembly (a fifth step).

Next, in a state in which the upper opening of the valve main body 40 which is previously prepared and is made of the resin is faced to the lower opening of the second outlet port 10a, the upper opening of the valve main body 40 is arranged such that the annular welding wall 33 of the mold cover 30 is arranged inside the annular welding joint wall 44 of the valve main body 40 and outside an edge of the upper opening. At this time, the annular welding joint wall 44 is positioned outside the annular welding wall 33, and the valve holder 60 is energized downward by the coil spring 66, so that the valve body 64 is in a state in which the valve body 64 closes the opening of the first outlet port 42a.

In the case that the laser beam is irradiated to the outer peripheral surface of the annular welding joint wall 44 from an external portion, the laser beam passes through the annular welding joint wall 44 so as to be concentrated on one point of the outer peripheral surface of the annular welding wall 33. One point of the outer peripheral surface of the annular welding wall 33 is molten by heating the one point, and the inner surface of the annular welding joint wall 44 which is faced to the molten outer surface is also molten. As a result, the annular welding wall 33 and the annular welding joint wall 44 are fixed by welding only at the point to which the laser beam is irradiated. The inner peripheral surface of the annular welding joint wall 44 and the outer peripheral surface of the annular welding wall 33 are fixed by welding all around a periphery by rotating the valve main body 40. As a result, the solenoid valve 1 is finished by assembling the valve main body 40 in the valve assembly (a sixth step).

Next, a description will be given of a motion of the solenoid valve 1 having the structure mentioned above.

In the case that the electromagnetic coil 21 is not excited, the valve body 64 is pressed downward by the valve holder 60 which is energized downward by the coil spring 66, and the lower surface of the valve body 64 closes the opening of the first outlet port 42a. Accordingly, the liquid (for example, the washer liquid) flowing into the valve chamber 45 from the inlet port 41a of the inflow pipe 41 is not guided to the first outlet port 42a, but is guided to the lower end opening of the second outlet port 10a of the pipe member 10 from the liquid insertion hole 63 of the valve holder 60 via an interior side of the valve chamber 45, flows out of the upper end opening of the second outlet port 10a, and is injected, for example, to a front window glass or a rear window glass.

On the other hand, in the case that the electromagnetic coil 21 is excited from the external terminal 36, the electromagnetic coil 21 is excited. Since the plate 26, the housing 70, the suction element 50 and the valve holder 60 are made of the magnetic material, a magnetic path passing a magnetic field generated by the electromagnetic coil 21 is formed by these elements. Therefore, the magnetic field generated by the electromagnetic coil 21 passes through the magnetic path, a magnetic force generated by the magnetic field acts on the suction element 50, and a force moving the valve holder 60 in an upward direction is generated in the suction element 50. As a result, since the suction element 50 moves upward the valve holder 60 against the downward spring force generated by the coil spring 66, the upper surface of the valve body 64 closes the lower end opening of the second outlet port 10a. As a result, the washer liquid flowed into the valve chamber 45 from the inlet port 41a is not guided to the second outlet port 10a but is guided to the upper end opening of the first outlet port 42a via the valve chamber 45, flows out of the lower end opening of the first outlet port 42a, and is injected, for example, to a rear camera.

In other words, the flow path is changed within the valve chamber 45 so that the valve body 64 always closes the first outlet port 42a and opens the second outlet port 10a, and the valve body 64 moves on the basis of the suction of the suction element 50 caused by the magnetic force of the excited electromagnetic coil 21 so as to close the lower end opening of the second outlet port 10 and open the upper end opening of the first outlet port 42a.

In the description mentioned above, the solenoid valve 1 is structured such that the solenoid valve 1 is mounted on the vehicle, and switches the flow path of the liquid, for example, the cleaning fluid, and the other fluids, however, it goes without saying that the present invention is not limited to this, but may be provided in the other than the vehicle.

What is claimed is:

1. A solenoid valve comprising:
    a valve main body which has a valve chamber communicating with each of an inlet port and a first outlet port;
    a valve body which is arranged within said valve chamber;
    a valve holder which retains said valve body and is made of a magnetic material;
    an energizing member which energizes said valve holder in a direction of said first outlet port;
    a pipe member which has a second outlet port communicating with said valve chamber and is extended upward from said valve chamber;
    a suction element which is formed in a cylindrical shape and surrounds said pipe member, such that said pipe member is inside said suction element, wherein said suction element is configured to be separated from a fluid flow passing through said solenoid valve;
    a coil bobbin which surrounds said valve holder and said suction element;
    an electromagnetic coil, wherein said electromagnetic coil is wound around said coil bobbin; and
    a mold cover which surrounds a whole of said coil bobbin, is integrated with said valve main body and defines said valve chamber by said valve main body, said pipe member and said coil bobbin,
    wherein said valve main body, said pipe member, said coil bobbin and said mold cover are formed by a resin material,
    wherein said suction element is made of a magnetic metal,
    wherein said valve holder is slidably arranged inside a lower portion of said coil bobbin, and has a tube body which faces to said suction element, a fluid insertion hole which is pierced in said tube body, and a retention portion which retains said valve body,
    wherein when said electromagnetic coil is excited, said valve holder is sucked by said suction element and said valve body closes said second outlet port of said pipe member,
    wherein when said electromagnetic coil is not excited, said valve holder is energized by said energizing member and said valve body closes said first outlet port,
    wherein said coil bobbin is provided with a collar wall which faces to said valve main body, and an annular welding projection portion which protrudes toward said valve main body from said collar wall and is welded to an inner peripheral surface of said mold cover,
    wherein said annular welding projection portion is provided with a tapered surface, wherein the diameter of said tapered surface is reduced from an inner peripheral surface in a leading end side of said annular welding projection portion toward an inner peripheral surface in a base side of said annular welding projection portion, and a burr accommodating space which is constructed between said tapered surface and an outer peripheral surface of said valve holder, and
    wherein said annular welding projection portion accommodates in said burr accommodating space a burr which is generated in a bonded surface between said annular welding projection portion and the inner peripheral surface of said mold cover when said mold cover is resin molded in said coil bobbin so as to keep clearance.

2. The solenoid valve according to claim 1, wherein said valve holder is provided with a small tube portion which is formed at a smaller diameter than said tube body.

3. The solenoid valve according to claim 1, wherein said pipe member, said coil bobbin and said mold cover are formed sequentially according to a resin molding process, and said mold cover and said valve main body are integrally formed by a laser welding process.

4. The solenoid valve according to claim 2, wherein said pipe member, said coil bobbin and said mold cover are formed sequentially according to a resin molding process, and said mold cover and said valve main body are integrally formed by a laser welding process.

5. The solenoid valve according to claim 2, wherein said small tube portion is provided with said fluid insertion hole and said retention portion.

6. The solenoid valve according to claim 1, wherein said suction element is arranged between an inner peripheral surface of said coil bobbin and an outer peripheral surface of said pipe member.

* * * * *